Dec. 21, 1926.  1,611,374
W. L. REBO
LICENSE PLATE FOR MOTOR VEHICLES
Filed March 25, 1925
*Fig. 1*
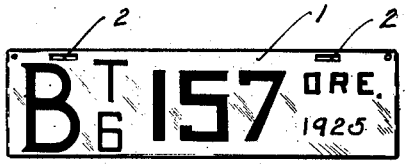
*Fig. 2*
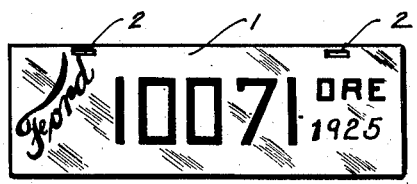
*Fig. 3*
*Fig. 4*
Inventor
William L. Rebo
By his Attorney
Thomas Rilyeu.

Patented Dec. 21, 1926.

1,611,374

UNITED STATES PATENT OFFICE.

WILLIAM L. REBO, OF PORTLAND, OREGON.

LICENSE PLATE FOR MOTOR VEHICLES.

Application filed March 25, 1925. Serial No. 18,215.

My invention is adapted for use upon automobiles to designate primarily the make and character of vehicle, the license number thereof, the State licensing the same, and the year in which the same was licensed and is adapted for national use, for interstate use, as well as for limiting the same for use in the various States only.

A further object of my invention is to make in legible form and easily read, the make of the automobile, the type of the automobile, and the character of the same, by seeing the license plate only, and is adapted for use upon the motor vehicle to designate the same and need not be changed unless so prescribed by statute from year to year.

A further object of my invention is to provide a simple and efficient means of designating the name of the maker of the automobile, the license number, the locality in which the same is licensed, and the year upon which the same was issued.

With these and incidental objects in view, the invention consists in certain novel features of construction and combination of parts, the essential element of which are set forth in the appended claims and to a preferred form of embodiment of which is hereinafter shown with reference to the drawings which accompany and form a part of this application.

In the drawings:—

Fig. 1 is a plan elevation of an automobile license plate.

Fig. 2 is a plan view of a license plate, showing the name of the maker spelled out.

Fig. 3 is a plan view of the automobile license plate, showing the insignia of the maker of the automobile.

Fig. 4 is a plan view of an automobile license plate, showing the insignia of the automobile and wherein the same is spelled out as to the character of the same.

Like reference characters refer to like parts throughout the several views.

1 is the automobile license plate, made of rigid material, as steel, aluminum or other suitable material adapted to having embossing or raised surfaces pressed thereupon from the material composing the same, and having supporting slots 2 therein, for securing the same in fixed position in relationship with the frame of the motor vehicle. On the left of the same I have provided a space to be utilized in designating the maker of the car, as in Fig. 1, a large letter B may be interpreted to mean Buick automobile, the small letter t may be designated to mean touring car, and the six thereunder to designate the number of cylinders of the vehicles, thus it may be made to read Buick touring car, six cylinders. In the central position of the plate the license number of the vehicle would be displayed and on the right hand side the State licensing the same and there beneath the year in which the license is issued. In Fig 2 in the left position of the license plate, I have designated the Ford automobile, by the usual insignia, and in the central position, license number, and on the right space the State and year in which the same was issued. In Fig. 3, on the left hand position I have designated the Star automobile by the usual star within a circle, and there beneath, the capital letter R meaning roadster, in the central position I have designated the license number and in the right hand space, the State issuing the license and the year in which the same was issued. In Fig. 4, I have shown a license plate wherein GMC name plate of the General Motors Company is shown, and there beneath the word Truck; in the central position I have shown the license number, and in the right position, the State and the year in which the license was issued.

It is highly important that some means be developed wherein at a glance will be designated the name of the automobile, the type, the license number, and by what community or municipality or State the same is licensed and the year and it is also quite important, because of the expense involved and the annoyance therewith, that this license plate be made on substantial material and that when once attached to the motor vehicle that the same shall become a permanent fixture of the vehicle and will be transferred with the same and will not be changed, and there is every reason why this should be done by the maker of the motor vehicle and should be a permanent fixture thereof and thereto.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim—

1. A license tag for vehicles having printed thereon the factory number of the vehicle in the order of its manufacture, and further having printed at one end thereof the make and type of car and at the other end thereof the licensing subdivision.

2. A license tag for vehicles having printed thereon the factory number of the vehicle in the order of its manufacture, and further having printed at one end thereof the make and type of car and at the other end thereof the licensing subdivision and the year of the license.

WILLIAM L. REBO.